United States Patent [19]

Länger et al.

[11] 4,339,776
[45] Jul. 13, 1982

[54] PREPROGRAMMABLE RECORDING SYSTEM WITH AUTOMATIC WARNING OF TIME LIMIT

[75] Inventors: Erich Länger; Helmut Mach; Harald Melwisch, all of Vienna, Austria

[73] Assignee: U.S. Philips Corporation, New York, N.Y.

[21] Appl. No.: 69,442

[22] Filed: Aug. 24, 1979

[30] Foreign Application Priority Data

Sep. 1, 1978 [AT] Austria .................................. 634178

[51] Int. Cl.³ ...................... G11B 23/04; G11B 23/42
[52] U.S. Cl. ........................................ 360/69; 360/93; 360/132
[58] Field of Search ............... 360/69, 137, 132, 72.3, 360/74.1, 74.2, 74.5, 91–93, 96.1, 15; 179/100.1 DR, 100.1 PS

[56] References Cited

U.S. PATENT DOCUMENTS

| | | | |
|---|---|---|---|
| 3,557,360 | 1/1971 | Aldridge | 360/137 |
| 3,712,559 | 1/1973 | Schwartz | 242/199 |
| 3,723,666 | 3/1973 | Ferrari | 179/100.1 VC |
| 3,761,643 | 9/1973 | Keeler | 360/137 |
| 3,821,816 | 6/1974 | Habelt | 360/137 |
| 3,921,215 | 11/1975 | Asami | 360/137 |
| 4,021,855 | 5/1977 | Czonka et al. | 360/92 |
| 4,075,669 | 2/1978 | Louzil et al. | 360/92 |
| 4,177,488 | 12/1979 | Sakai | 360/137 |
| 4,197,561 | 4/1980 | McMullen et al. | 360/4 |
| 4,206,483 | 6/1980 | Nakamura | 360/137 |

*Primary Examiner*—Alfred H. Eddleman
*Attorney, Agent, or Firm*—David R. Treacy

[57] ABSTRACT

A recording system for recording signals on a magnetic tape uses a recording apparatus and cassettes, each cassette containing a specific length of magnetic tape, and has a timer for setting time-preprogrammed automatic recordings.

A detection unit determines the maximum time available for recording on a cassette placed in the apparatus and a comparator compares an output signal of the detection unit with a reference quantity which is a measure of the total time required for the preprogrammed automatic recording(s). When this required time exceeds the maximum time available for recording with this cassette, an alarm signal is produced. The cassette has marks which are sensed by the detection unit and which indicate the length of the magnetic tape in the cassette.

10 Claims, 3 Drawing Figures

PREPROGRAMMABLE RECORDING SYSTEM WITH AUTOMATIC WARNING OF TIME LIMIT

BACKGROUND OF THE INVENTION

The invention relates to a recording system for recording signals on a magnetic tape, which system comprises a recording apparatus (recorder) and a cassette which contains a specific length of magnetic tape and which can be placed onto the recorder, the recorder including a timer for determining at least one start and one stop instant for automatic recording at a preprogrammed future time.

Such a known recording system is for example employed for automatically recording television signals, and is described in the magazine "Elektronikschau" 1977, Heft 5, pages 47 to 50. The timer enables a preprogrammed automatic recording to be made within a comparatively long period of time, for example four days. Furthermore, different types of cassettes are available, which differ from each other in respect of the lengths of magnetic tape. When preprogramming a recording the user of such a recording system should ensure that a cassette is used which contains such a length of tape that it can actually accommodate the entire preprogrammed automatic recording.

SUMMARY OF THE INVENTION

It is the object of the invention to improve the ease of operation of preprogrammable automatic cassette recording system and to exclude incorrect operation.

In accordance with the invention the recording apparatus comprises at least one detection device or unit for detecting the recording time attainable with a cassette placed on the apparatus, and a comparator which controls a warning device for warning the user of the recorder. The comparator receives an output quantity from the detection unit, which output quantity is a measure of the recording time attainable with the cassette, as well as a reference quantity which is derived from the timer and which is a measure of the total automatic recording time preprogrammed by means of the timer, the warning device being actuated when the time needed for the preprogrammed automatic recording exceeds the recording time attainable with the cassette. In this way the user of the recorder is automatically warned if a cassette is selected which can only accommodate a recording period shorter than that preprogrammed by means of the timer. The invention thus prevents inadvertent preprogramming of more material than the cassette can handle, as might happen especially if by means of the timer a plurality of successive automatic recordings are preprogrammed, and the user commits errors in adding the lengths of the individual automatic recordings.

There are several possibilities of realizing such a recording system in respect of the choice of the detection unit to be used for detecting the recording period attainable with a cassette inserted in the recording apparatus; as an example, it is possible to employ optical or mechanical devices for detecting the available length of tape. It is found to be simple and advantageous if the detection device of the apparatus is provided with a sensing device for sensing at least one tape-length mark provided on the cassette, the mark indicating the total length of magnetic tape contained in said cassette. This enables the maximum recording period of this cassette, which is proportional to the total length of the magnetic tape in the cassette, to be determined in a simple manner. It is obvious that a user of the recording apparatus, if several successive automatic recordings are programmed, will use a cassette whose total length of magnetic tape is still available for recording. In this case it suffices to compare the sum of the lengths of the preprogrammed automatic recordings with the maximum recording time of the cassette which is used. There are various ways to produce realizing a tape-length marking. As an example an optical mark may be used, which is then optically detected. Mechanical tape-length marks in the form of tabs or recesses on the cassette are also possible which are sensed by sensors.

Another possibility is that several marks together in the form of a binary code represent different lengths of magnetic tape.

It is found to be particularly advantageous if the recorder detection unit is adapted to detect the length of tape that is actually available for recording in a cassette placed on the recording apparatus. This ensures that incorrect operation is avoided because allowance is made for the fact that a certain length of magnetic tape in the cassette is no longer available for further recordings because of previously made recordings. This also enables preprogrammed automatic recordings to be made on cassettes in which already a specific length of magnetic tape is unwound from the supply reel and is consequently no longer available for further recordings. The detection unit may again be any of various known devices and thus be adapted to specific requirements, known in the art. As an example the detection device may comprise mechanical or optical means which detect the instantaneous length of magnetic tape contained on the supply reel of the cassette. However, is also possible to provide marks on the magnetic tape itself, enabling the detection device to ascertain at which point on the magnetic tape a new recording begins, so that it is then automatically detected how much magnetic tape is still available for recording.

As a detection device it is also possible to use a device as for example described in German Offenlegungsschrift No. 27 30 134 for detecting the length of magnetic tape wound from a supply reel onto a take-up reel of a cassette, which uses the difference in speed of rotation of the supply reel and the take-up reel as detection criterion. Such detection devices should then permit compensation for various parameters, such as the total length of magnetic tape, the thickness of the magnetic tape, and the diameter of the supply-reel and take-up reel hubs.

In a preferred embodiment of the invention the detection unit of the recording apparatus comprises a first detection device, having a sensing device for at least one mark, provided on the cassette, which indicates the total length of magnetic tape contained in said cassette, and a second detection device which is adapted to detect the length of magnetic tape which is actually available for recording in a cassette placed on the apparatus, the output quantity of the first detection device serving as reference quantity for the second detection device.

In this way the total length of magnetic tape in a cassette may also be a variable parameter, which is advantageous in view of the frequently occurring practical situation that a recording system employs cassettes with different lengths of magnetic tape. The total length of magnetic tape is then automatically detected by the first detection device and allowance is made for this in determining the actual length of magnetic tape still available for recording.

Suitably, the detection unit used in the recording apparatus is also adapted to determine whether or not a cassette has been inserted in the recording apparatus. When programming an automatic recording, a user of the recording apparatus is thus warned immediately if no cassette is inserted in the recording apparatus so that the apparatus is consequently not ready for operation.

To provide particularly simple construction it is found to be advantageous if the recorder includes a microprocessor, which at least serves to constitute the timer, part of the detection unit and the comparator. By means of such a microprocessor a simple compact construction is obtained and the operations required in this respect can be realized in a simple manner.

The invention also relates to a cassette for a recording system in accordance with the invention, which cassette is provided with at least one detectable mark. In accordance with the invention the cassette is provided with a detectable tape-length mark which indicates the total length of magnetic tape contained in the cassette. This ensures that an important parameter of the cassette, namely the maximum recording time attainable with said cassette, which time is proportional to the total length of the magnetic tape, can be determined in a simple manner by means of a sensing operation.

Preferably a cassette (which as usually is provided with a cassette housing having two parallel substantially rectangular major walls connected by side walls) is used on which the tape-length marking is provided in a multi-bit binary code, each bit being constituted by a sub-marking, which occurs in one of two specific conditions. An important advantage of this is that by means of n submarkings in principle a total of $2^n$ types of cassettes provided with different amounts of magnetic tape can be distinguished from each other. Thus, it is for example possible that in principle a recording system in accordance with the invention can be used in conjunction with eight types of cassettes of different playing times by the use of a 3-bit coded tape length marking.

It is advantageous if the different types of cassettes, in spite of their different tape length markings and thus the different amounts of magnetic tape which they contain, can all be assembled from the same components. In a preferred embodiment of this aspect of the invention the cassette housing is provided with marking apertures which can be closed by removable wall portions and one of the two conditions of each sub marking is constituted by the presence of the removable wall portion of a marking aperture and the other of the two conditions by the absence of the removable wall portion. In this embodiment all cassette housings may be assembled using identical components. In order to mark the amount of magnetic tape contained in the cassette one or more of the removable wall portions are removed by means of a very simple tool, in conformity with the binary code used. In view of the space which is available within the cassette it is advantageous if the sub-markings are located near a corner in a major wall of the cassette housing. In this embodiment the space which is available in the cassette between the major walls and the side walls which meet in said corner and the circular reel is used in an optimum manner. An additional advantage of this embodiment is that especially in recording equipment in which the cassette is inserted in a movable cassette holder which, together with the cassette contained therein, is subsequently moved to an operating position the tape length marking of the cassette is arranged at a location which is suitable to cooperate with the detection unit or device of the recording apparatus. Moreover, the manner in which the part of the cassette with the tape length marking is moved from and to the detection unit by the cassette holder is favourable.

This last-mentioned advantage plays a part in a recorder for a recording system in accordance with the invention, in which a detection unit of the recorder, for determining the amount of magnetic tape which is actually available for recording in a cassette placed on the recorder, is provided with a number of detection switches, corresponding to the number of bits of the binary code of the tape marking, each provided with a springloaded movable detection member for detecting the condition of a sub-marking on the cassette, which detection member in the absence of a removable wall portion is at least partly disposed in a marking aperture, the respective detection switch then being in a first condition, and in the presence of the removable wall portion engages the wall portion, the detection switch then being in a second condition. By moving the cassette holder from and towards its operating position at least one of the detection members, at least if locally a removable wall portion is present, is moved against the spring load. This can be realized without the use of additional motion-transmitting parts, if in accordance with a further embodiment the detection members of the detection switches comprise detection pins which are depressable in their longitudinal directions.

In yet another embodiment no special means are required in order to determine whether or not a cassette has been placed on the recording apparatus. This embodiment is characterized in that the detection device unit is adapted to ascertain that, if all detection switches are in their first condition, no cassette is placed on the recording apparatus. In this embodiment it is obvious that one of the binary words of the binary tape length marking code should be reserved for other purposes. Thus, when three sub-markings are used this means that seven instead of eight types of cassettes of different playing time may be employed. However, in practice this limitation does not necessarily present a drawback.

The invention is described in more detail with reference to the drawings which show two embodiments to which the invention, however, is not limited.

DESCRIPTION OF THE PREFERRED EMBODIMENTS

Figure 1:
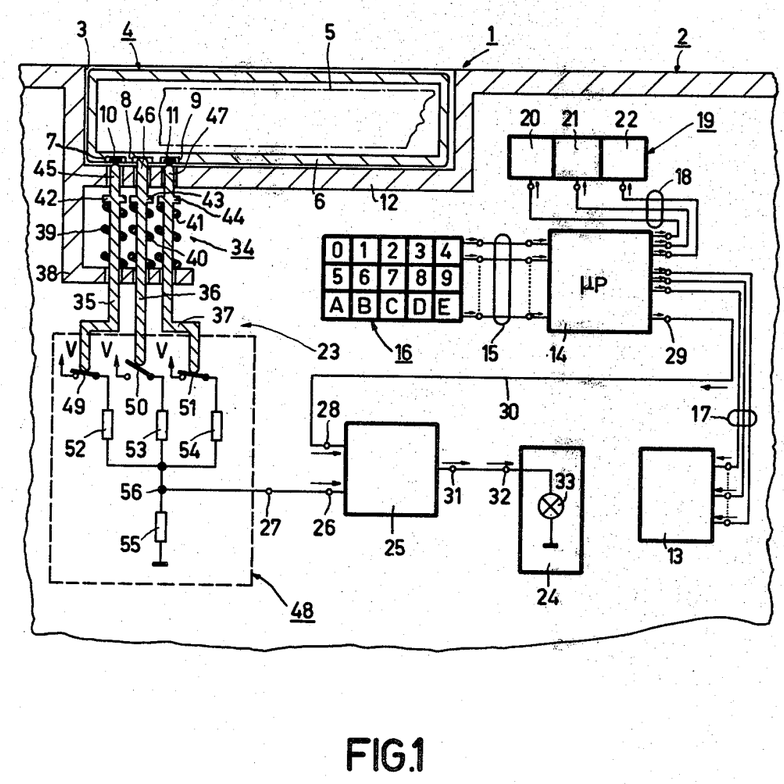
FIG. 1, is a combined schematic diagram and diagrammatic view partly in cross-section, of a recording system whose recorder includes a detection unit for detecting the total length of the magnetic tape contained in a cassette.

FIG. 1 shows those parts of a recording system 1, which are essential for the invention, which system comprises a partly shown recorder 2. The recorder 2 has a cassette receptacle 3 for receiving a cassette 4, which depending on the type of cassette contains a different length of magnetic tape.

FIG. 1 shows such a cassette 4 inserted in the receptacle 3 of the recording apparatus, the magnetic tape 5 accommodated in the cassette being symbolically represented by dash-dot lines.

As can be seen in FIG. 1, the cassette 4 is formed with three recesses 7, 8 and 9 in a side wall 6, in which recesses tabs are arranged which may be broken out and which constitute detectable marks. In the present case two tabs 10 and 11 in the two recesses 7 and 9 are left in the cassette 4, while the tab corresponding to the recess 8 has been broken out or has not been provided. The tabs serve to indicate the total length of magnetic tape 5 contained in the cassette 4. Each tab may then correspond to a specific length of magnetic tape, so that in the present case three types of cassettes with different lengths of magnetic tape can be distinguished from each other. However, coded combinations of tabs which are present or have been removed may also be used, so that in the case of a binary code a maximum of eight types of cassettes can be distinguished from each other with the present cassette having three tabs.

The cassette 4 shown in FIG. 1 can only be inserted in the cassette receptacle 3 in one specific position, namely so that its wall 6 is positioned on the bottom 12 of the cassette receptacle. In order to enable recordings to be made on the magnetic tape 5 in the cassette 4 contained in the cassette receptacle 3, the apparatus 2 is equipped, in known manner, with a drive arrangement for the transport of the tape, with a scanning device, which for example comprises magnetic recording heads, erase heads, control signal heads etc., for scanning the tape, with amplifier arrangements for amplifying signals to be recorded on the tape, and other assemblies and circuits. For the sake of clarity these assemblies are not shown in FIG. 1, because they are not essential for the invention. In order to enable all these to be controlled correctly, to be put into and out of operation, and to switch further functions of the apparatus or the apparatus itself on and off, the recording apparatus 2 is equipped with a control device 13, which in a manner not shown performs these control operations, in that it cooperates with the corresponding apparatus parts. For this purpose the control device may comprise electronic or electromagnetic circuit elements, such as switching transistors, electromagnets and the like.

The recorder 2 also includes a microprocessor 14, to which an input device 16 is connected for sending instructions over an input bus 15, which input device is provided, in known manner, with a number of switching buttons marked with symbols. The control device 13 is connected to the micro-processor 14 by an output line. Thus it is ensured that instructions applied to the microprocessor 14 by means of the input device 16 over the bus 15 are processed in the processor, and are transferred to the control device 13 in processed form as control signals over the bus 17. The control device 13 controls the recording apparatus in accordance with the applied instructions, for example for making a recording.

In order to enable a time-preprogrammed recording to be made with the recording apparatus 2, the instant at which the recording is to be started and stopped being determined prior to the actual recording, the apparatus is provided with a timer. In the present case, the timer is formed by part of the microprocessor 14 which performs the timer functions and in which moreover the start instant and the stop instant of at least one preprogrammed recording are entered, by means of the input device 16, and stored. For optical display of the times keyed into the timer a display device 19 is connected to the microprocessor 14 by a further output bus 18. The display device has three display elements 20, 21 and 22 for displaying the day, the hour and the minutes at which the recording is to be started or stopped preprogrammed. It is obvious that this display device may also be adapted to display other functions or data; it may also continuously display the time. By comparison of the stored times with the present time, when the starting instant is reached the microprocessor then ensures that automatically such control signals are supplied to the control device 13 over the bus 17 that the control device causes automatic recording in the recorder to be started. When the stop instant is reached the microprocessor in a similar way ensures that the previously started recording is automatically terminated. Thus, the microprocessor performs all the usual functions of a timer, while enabling several automatic recordings in succession to be programmed.

In the case of such a time-preprogrammed recording it is obvious that it is only guaranteed that the desired recording is completely recorded on the magnetic tape in a cassette if the length of tape available for recording is sufficient for this purpose. Until now a user of such a recording system had to make sure that the recording period attainable by means of a cassette inserted in the apparatus was sufficient to allow a preprogrammed automatic recording to be recorded completely. Especially if several automatic recordings over a long period of time are preprogrammed, this is inconvenient and may give rise to incorrect operation.

In order to eliminate this problem the recorder 2 of FIG. 1 includes a detection unit or device 23 for detecting the recording time attainable with a cassette 4 placed on the apparatus, and a comparator 25 which controls a warning device 24 for warning the user of the apparatus. The comparator 25 thus receives the output quantity of the detection device 23, which is a measure of the recording time attainable with the cassette, at an input 26, for which purpose an output 27 of the detection device 23 is connected to the input 26 of the comparator 25. Moreover, at a second input 28 the comparator 25 receives a reference quantity which is derived from the timer constituted by the microprocessor 14 and which is a measure of the total time, determined by means of the microprocessor during which preprogrammed automatic recording is possible, for which purpose a corresponding output 29 of the microprocessor 14 is connected to the input 28 of the comparator 25 over an output line 30. The output 31 of the comparator 25 is connected to the input 32 of the warning device 24, which device in the present example has a lamp 33 which lights up if the total time for preprogrammed automatic recording with the apparatus is greater than the recording time attainable with the cassette.

In the recording system in accordance with FIG. 1 it is assumed that in the case of a time-preprogrammed automatic recording a cassette is inserted whose total length of tape is still available for recording. In practice this requirement is usually met. Therefore, the detection device 23 of the recording apparatus 2 is designed accordingly, and in the present case comprises a sensing device 34 for the marks provided on the cassette 4, which marks indicate the length of magnetic tape contained in the cassette and are constituted by the tabs. The sensing device 34 has three slides 35, 36 and 37, which are guided so as to be movable perpendicularly to the bottom 12 of the cassette receptacle 3 and to sense the tabs in the cassette. The slides are each urged in the direction of the bottom 12 under the influence of springs 39, 40 and 41 respectively which bear against a bracket 38 on the apparatus. The three slides 35, 36 and 37 are each provided with a collar 42, 43, or 44 respectively, against which the springs 39, 40 and 41, which cooperate with the corresponding slide, bear. When a cassette is inserted in the cassette receptacle 3, each slide 35, 36 and 37 engages (bears against) the bottom 12 with its collar 42, 43 or 44 under the influence of the springs 39, 40 and 41 which act on the slides, the free ends 45, 46 and 47 of the slides 35, 36 and 37 projecting into the cassette receptacle 3 through the bottom 12. When a cassette has been inserted into the apparatus the slides 35, 36 and 37 are set to a specific position in accordance with the combination of tabs which are present or absent, as can be seen in FIG. 1.

For decoding the positions of the slides 35, 36 and 37 the detection device 23 is furthermore provided with a decoding device 48, which comprises three switches 49, 50 and 51 which cooperate with the slides 35, 36 and 37. One contact of each switch is connected to a common voltage source V and the other contact of each switch is connected to a resistor 52, 53 and 54 respectively. The ends of the resistors 52, 53 and 54 which are remote from the switches are interconnected and connected to one end of a further resistor 55, whose free end is connected to earth. The resistors 52, 53, 54 and the resistor 55 then constitute a voltage divider, whose dividing ratio depends on the positions of the switches 49, 50, 51 and thus on the positions of the slides 35, 36, 37 which cooperate with the switches. The dividing ratio of the voltage divider then determines the output quantity of the decoding device 48, which appears on the tap 56 of the voltage divider and which at the same time constitutes the output quantity of the detection device 23 which is applied to the comparator 25. Thus, the output quantity of the detection device 23, which is determined by the positions of the slides defined by the tabs on the cassette, represents a measure, indicated by the tabs on the cassette, of the total length of the tape in the cassette, so that the output quantity at the same time represents a measure of the maximum recording time attainable with the cassette.

As is shown in FIG. 1, the two slides 35 and 37 are set to such a position by the two tabs 10 and 11 that the switches 49 and 51 which cooperate with the slides 35 and 37 are in the closed positions. However, the slide 36 does not engage a tab, so that under the influence of the spring 40 which acts on it, it is urged with its free end 46 into the recess 8 formed in the wall 6 of the cassette 4. The switch 50 which cooperates with this slide 36 is then in its open position. Because of this setting of the switches 49, 50 and 51 a specific dividing ratio of the voltage divider 52, 53, 54 and 55 is obtained, which results in a specific output quantity of the detection device 23 on its output 27. This output quantity is applied to the comparator 25 over the input 26.

If the user of the present recording system now for example programs several automatic recordings each with a start instant and a stop instant by means of the timer constituted by the microprocessor 14, the following process is performed in the apparatus. In the microprocessor the length of each preprogrammed recording is determined and stored, after which the sum of the lengths of all preprogrammed recording are determined and an output quantity is formed corresponding to that sum. This output quantity of the microprocessor is transferred as a reference quantity from its output 29 to the input 28 of the comparator 25 over the output line 30. The comparator 25 now compares the quantities applied to its inputs 26 and 28, which are available as electrical signals in analog form, and in the event that the maximum recording time attainable with the cassette and determined by the detection device 23 is shorter than the total length required for the automatic recordings preprogrammed on the apparatus by means of the timer it supplies an actuating signal to the warning device 24. The lamp 33 of the warning device 24 then lights up and thus provides a visual indication to the user that the programming is incorrect. In the present case the comparator 25 should compare two analog quantities, which can easily be performed by forming their difference.

As stated previously, the slides 35, 36, 37 are each loaded by a spring 39, 40, 41, which urge each slide with its collar 42, 43 and 44 against the bottom 12 of the cassette receptacle 3 when a cassette is inserted in the receptacle. The slides are then kept in such positions that the switches 49, 50 and 51 of the decoding device 48 which cooperate therewith are all in the open position. In these switch positions no voltage appears on the output 27 of the detection device 23 as output quantity, which indicates that no cassette and thus no magnetic tape is available in the apparatus for the purpose of recording. Thus the output quantity in this case indicates that the available recording time is zero. When in this case the recording system is preprogrammed, the comparator device 25 detects that the available recording time is smaller than required for the preprogrammed automatic recording. Consequently the warning device 24 is controlled in the previously described manner so that the device provides an optical warning signal with the lamp 33. In this arrangement the detection device 23 is also suitable for detecting whether or not a cassette has been inserted in the recorder.

In the case of a recording system having a recorder which accepts different types of cassettes containing different lengths of magnetic tape, which system enables preprogramming of automatic recordings with the aid of a timer it is thus ensured, that erroneous programming of the total time required for preprogrammed automatic recordings relative to the recording time attainable with a cassette is virtually avoided. In the case of such an incorrect programming, this condition is immediately signalled to the user by an optical indication, so that the user may correct the programming or insert a different cassette with a greater recording capacity. The construction of the detection device with a mechanical sensing device for the tabs on the cassette which serve as mechanical marks ensures a robust and reliable arrangement, which in this case is also suitable to detect the presence or absence of a cassette in the apparatus.

Figure 2:
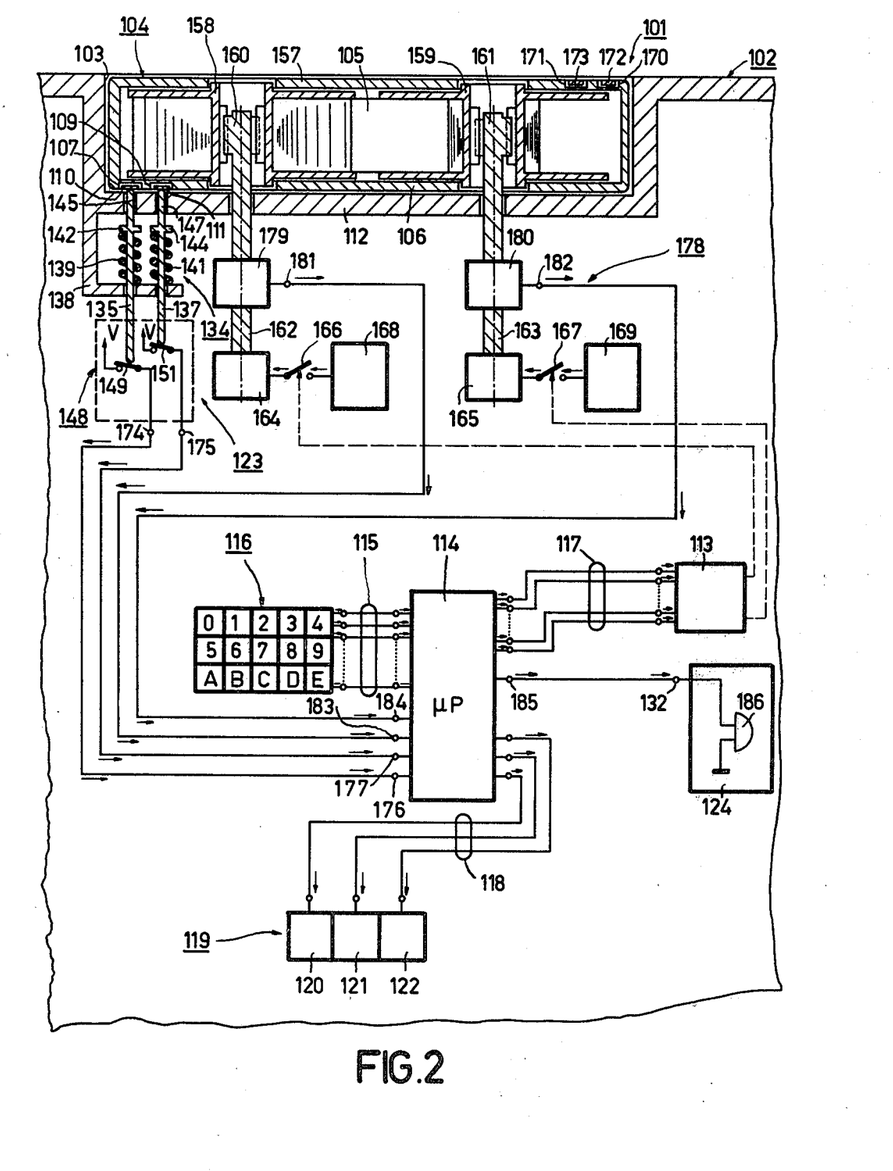
FIG. 2 is a similar diagram and view, partly in cross-section, of a recording system whose recorder includes two detection devices, one device detecting the total length of the magnetic tape contained in the cassette and the second device detecting the length of magnetic tape in this cassette which is actually available for recording.

The recording system 101 shown in FIG. 2 serves for use in conjunction with reversible cassettes. The rerecording system. Thus, the two last-mentioned parameters may be permanently stored in the microprocessor. The variable parameter relating to the total length of the magnetic tape in a cassette is automatically entered into the microprocessor for each individual cassette. If desired, other parameters may be indicated on a cassette in the form of detectable marks, which are then detected by suitable detection devices, which in their turn transfer the information detected by means of the marks to the microprocessor.

The second detection device is constructed so that it may also be used for determining whether or not a cassette has been placed in the apparatus. If no cassette is placed on the apparatus, the winding mandrel corresponding to the supply reel remains stationary, so the corresponding tachogenerator does not supply an output signal. This situation can be assessed in the microprocessor, which then drives the warning device so as to provide a suitable warning signal.

The embodiment of FIG. 2 ensures that incorrect operation is prevented, even if a cassette is used which is already partly recorded or wound forward. The time which is actually available for recording is derived from the available length of tape and is compared with the time required for preprogrammed automatic recording selected by a user of the recording system. If no cassette is placed in the apparatus, the user is warned. The use of the microprocessor for the formation of the timer and the second detection as well as the comparator device has the advantage that a very compact and economic construction is obtained.

It is obvious that a series of modifications to the embodiments described herein are possible within the scope of the invention. This is especially so in respect of the construction of the two detection devices, the comparator device and the warning device. As an example, it is also possible to design a recording system so that in the case of incorrect programming the comparator device supplies a signal to the control device of the apparatus, which energizes a further device which causes the cassette to be ejected from the apparatus, so that the warning to the user is then constituted by the ejection of the cassette from the apparatus. A detection device for detecting the length of magnetic tape which is actually available for recording may for example also be formed by only one tachogenerator which is coupled to a reel and by one tachogenerator which detects the speed of transport of the record carrier, in which case the time actually available for automatic recording can be derived from the output quantities of these two tachogenerators.

Figure 3:
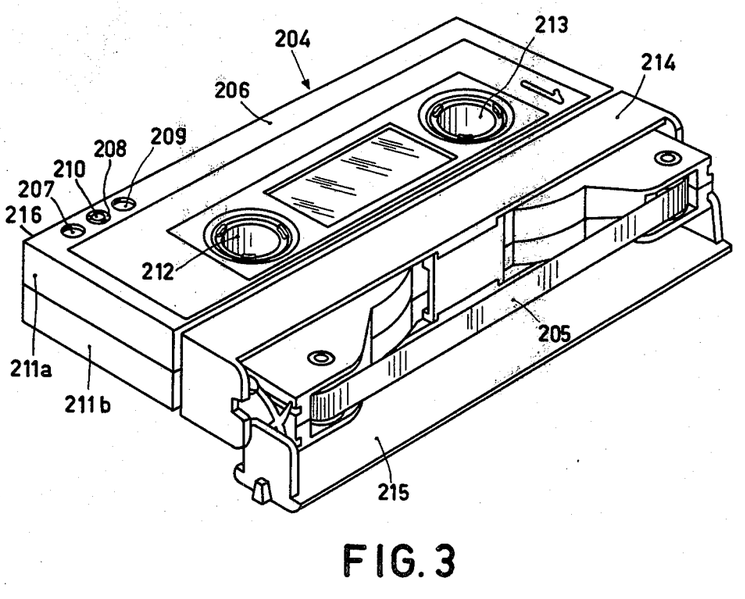
FIG. 3 is a perspective view of a video cassette belonging to a recording system in accordance with the invention.

The reversible video cassette 204 of FIG. 3 has a cassette housing, of which the Figure shows one plane major wall 206, a side wall comprising two portions 211a and 211b, two reels with reel hubs 212 and 213, a slide 214 and a cover 215 which is pivotable into two directions. By moving the slide 214 forward the cover can be closed in order to protect a magnetic tape 205. For a further description of the cassette reference is made to the co-pending U.S. Patent Application Serial No. 974,296 assigned to the assignee of this application. In this respect it is to be noted that the cassette is of the reversible type and that a recording on the magnetic tape 205 only covers half the tape width, while a recording can be made on the other half of the tape width after reversal of the cassette.

Near a corner 216 of the cassette three marking apertures 207-209 are formed in the major wall 206. The marking aperture 208 is provided with a removable wall portion 210. These sub-markings indicate the playing time of the cassette in accordance with a 3-bit binary code, namely in accordance with the following code in which a "0" means that no removable wall portion is present and an "x" means that the removable wall portion is still present.

| 207 | 208 | 209 | playing time. |
|-----|-----|-----|---------------|
| 0   | 0   | 0   | 2 × 30 minutes |
| 0   | 0   | x   | 2 × 90 minutes |
| 0   | x   | 0   | 2 × 150 minutes |
| x   | 0   | 0   | 2 × 210 minutes |
| x   | x   | 0   | 2 × 60 minutes |
| x   | 0   | x   | 2 × 120 minutes |
| 0   | x   | x   | 2 × 180 minutes |
| x   | x   | x   | 2 × 240 minutes |

As the cassette is reversible three identically coded sub-markings are of course provided in the other major wall, which in the drawing is shown on the lower side of the cassette and at a location which after reversal of the cassette coincides with the location of the sub-markings 207-209 shown in the drawing.

What is claimed is:

1. A recording system for recording signals on a magnetic tape, comprising a recording apparatus and a cassette containing a given length of magnetic tape and adapted to be placed onto said apparatus, the recording apparatus comprising means for preprogramming an automatic recording at a future time, and a timer for determining at least one start and one stop instant for the automatic recording, wherein the recording apparatus further comprises:
   at least one detection unit for detecting the recording time attainable with a cassette placed on the apparatus and providing an output corresponding thereto,
   a warning device for warning the user of the apparatus,
   means for deriving a reference quantity from the timer, which reference quantity is a measure of a total preprogrammed automatic recording time, and
   comparator means for comparing the detection unit output and the reference quantity, the comparator means having an output which controls said warning device, the warning device being actuated when the time needed for the preprogrammed automatic recording exceeds the recording time attainable with the cassette.

2. A recording system as claimed in claim 1, wherein the cassette includes at least one tape-length mark indicating the total length of magnetic contained in the cassette, and the detection unit includes a sensing device for sensing at least one of said marks on the cassette.

3. A recording system as claimed in claim 2, wherein said sensing device forms part of a first detection device having an output which is a measure of the total length of tape in the cassette, and the detection unit further comprises a second detection device for detecting the length of magnetic tape in the cassette which is actually available for recording, the output of the first detection device being a reference quantity for the second detection device.

4. A recording system as claimed in claim 2 wherein:
   the cassette has a housing having two parallel major walls interconnected by side walls, said at least one cording apparatus 104 has a cassette receptacle 103, in which a cassette 104 can be inserted either with a wall 106 or the other wall 157 facing the bottom.

Depending on the position of the cassette in the cassette receptacle a recording can be made on each half of a magnetic tape 105. The tape 105 is movable, in a known manner, between two reels 158 and 159 which are rotatable in the cassette 104, one of the reels serving as take-up reel and the other as supply reel depending on the position of the cassette in the cassette receptacle. In the situation shown in FIG. 2 the reel 158 for example serves as supply reel and the reel 159 as take-up reel. For driving the two reels 158 and 159 there are provided two winding mandrils 160 and 161 which are each mounted on a rotatable shaft 162 and 163. For driving each shaft 162 and 163 there are provided a motor 164 and 165 respectively cooperating with these shafts, which by a switch 166 and 167 respectively are connectable to a motor supply circuit 168 and 169 respectively for the power supply of the motors. The motor supply circuits 168 and 169 may then take the form of known control circuits for obtaining a specific tension in the tape or a specific speed of said tape. The switches 166 and 167, which of course may take the form of electronic switches, are controlled by a control device 133, as is indidated by the dashed lines in FIG. 2.

The cassette 104 has recesses 107, 109 and 170, 171 in its two walls 106 and 157 respectively, in each of which removable tabs 110, 111 and 172, 173 respectively are arranged as mechanically detectable marks. These tabs again indicate the total length of magnetic tape 105 accommodated in the cassette. The provision of tabs on both walls 105 and 157 of the cassette enables the detection of length of the magnetic tape, with the aid of a detection device 123 having a sensing device 134, in both positions of the cassette 104. Obviously, these marks may also be provided on a side wall of the cassette or may take the form of optically detectable marks, for example.

The detection device 123 of the apparatus shown in FIG. 2 comprises a sensing device 134 and a decoding device 148. These devices determine the length of tape contained in the cassette 104, and also detect the presence or absence of a cassette in the apparatus. The sensing device 134 has two slides 135 and 137, corresponding to the two tabs 110, 111 and 172, 173 respectively, which through two switches 149 and 151 of the decoding device 148 produce an output quantity. Each of the outputs 174 and 175 is connected to an input 176 or 177 respectively of the microprocessor 114, which in this case also constitutes the comparator which processes the output quantities of the decoding device 148.

In addition to the detection device 123 the apparatus shown in FIG. 2 includes a second detection device 178, which is adapted to detect the length of magnetic tape actually available for recording in a cassette inserted in the apparatus. The output quantity of the first detection device 123, which provides an indication about the total length of the magnetic tape contained in the cassette 104, serves as reference quantity for the second detection device 178.

The second detection device 178 has two tachogenerators 179 and 180 which are connected to the shafts 162 and 163, which generates on their outputs 181 and 182 supply an output quantity which is proportional to the speed of the reels 158 and 159. Each reel is, coupled to its corresponding tachogenerator 179 or 180 by the shaft 162 or 163 and the winding mandrel 160 or 161 respectively. Each output 181 or 182 of the tachogenerators 179 and 180 respectively is connected to an input 183 or 184 of the microprocessor 114. In this embodiment by microprocessor forms part of the second detection device, and performs the computation required for determining the length of magnetic tape actually available for recording in the cassette 104. When a recording is preprogrammed with the input device 116 the microprocessor 114 initiates a brief limited transport of the magnetic tape at a predetermined speed, through the control device 113. As a result of this the reels 158 and 159 are driven and the tachogenerators 179 and 180 supply information about the respective speeds of the reel 158 and the reel 159 to the microprocessor. With the aid of these quantities and the additionally entered further parameters which are required, such as the diameter of the hubs of the take-up reel and the supply reel, the thickness of the magnetic tape and the total length of the tape, the microcomputer computes the length of tape still contained on the supply reel, which represents the length of tape actually available for recording. This process may for example be performed in a manner as described in detail in German Offenlegungsschrift No. 27 30 134.

The value supplied by the microprocessor 114, which represents the length of tape carrier actually available for recording, is converted into a quantity which is the output quantity of the second detection device in the microprocessor. This quantity is again compared with the reference quantity corresponds to the total time required for the automatic recordings preprogrammed by the user, the reference quantity being derived from the data stored in the timer with the aid of the microprocessor. This comparison is performed in the microprocessor itself. The microprocessor thus also serves as the comparator and supplies a signal corresponding to the result of the comparison on an output 185. The output 185 of the microprocessor 114 is connected to the input 132 of the warning device 124, which in this embodiment takes the form of an acoustic signal generator. Thus a signal appears on the output 185 of the microprocessor 114 which signal actuates the signal generator 186, if the time required for the preprogrammed automatic recording is greater than the recording time attainable with the cassette, that is, the time corresponding to the length of magnetic tape actually available for recording.

For determining the length of magnetic tape actually available for recording, certain cassette parameters should be entered into the microprocessor, as stated previously. These parameters may for example be entered into the microprocessor by the manufacturer, or by the user by means of the input device 116. In the present example one of these parameters, namely the total length of magnetic tape in a cassette, is automatically entered into the microprocessor by means of the first detection device 123. As stated previously, this is effected by applying the two output quantities of the first detection device 123 to the microprocessor via its two inputs 176 and 177, said output quantities serving as reference quantities for the second detection device 178 for determining the length of magnetic tape actually available for recording. This step is advantageous because the total length of magnetic tape represents a cassette parameter which frequently varies depending on the type of cassette used. The other parameters, namely the thickness of the tape and the diameter of the reel hubs are generally the same for all cassettes of one mark being an apparatus-detectable tape-length mark provided in a multi-bit binary code on at least one of said walls, each bit being constituted by a submarking defined by the presence or absence of a removable wall portion over a marking aperture, and the sensing device comprises a plurality of detection members, corresponding to the number of bits of the binary code of the tape-length marking, and means for biasing each detection member to detect the presence or absence of a removable cassette wall portion by abutment against a wall portion which is present or by movement into the marking aperture in the absence of a removable wall portion.

5. A recording system as claimed in claim 4 wherein said detection members are pins parallel to each other and depressable in their longitudinal direction, movement of each of the pins to a position corresponding to the absence of a cassette removable wall portion being defined as a condition indicating that no cassette has been placed on the recording apparatus.

6. A recording system as claimed in claim 1, wherein the detection unit includes means for detecting the length of tape that is actually available for recording in the cassette placed on the apparatus.

7. A recording system as claimed in claim 1, 2 or 6 wherein the detection unit is adapted to detect whether or not a cassette has been placed on the recording apparatus.

8. A recording system as claimed in claim 6, wherein said means for detecting the length of tape available includes means for sensing a speed of rotation of a reel in the cassette, and means responsive to the sensed speed of rotation for determining the length of tape actually available.

9. A recording system as claimed in claim 1, 2, 3, 6 or 8 wherein the recording apparatus comprises a microprocessor, the microprocessor forming the timer, the comparator means, and part of the detection unit.

10. A magnetic tape cassette for use on a recording apparatus, the cassette comprising a housing having two parallel major walls interconnected by said walls, at least one of said housing walls having a marking aperture, and a length of magnetic tape in the housing; wherein the cassette is provided with an apparatus-detectable tape-length mark which indicates the length of the magnetic tape in the cassette, said marking being formed by a plurality of submarkings in a multi-bit binary code, the value of a binary bit being defined by the presence or absence of a removable wall portion over the aperture.

* * * * *